United States Patent
Boberski et al.

(10) Patent No.: US 11,847,702 B2
(45) Date of Patent: *Dec. 19, 2023

(54) INTEREST RATE SWAP COMPRESSION

(71) Applicant: Chicago Mercantile Exchange Inc., Chicago, IL (US)

(72) Inventors: David Andrew Boberski, Westport, CT (US); John Labuszewski, Westmont, IL (US); Michael O'Connell, Chicago, IL (US); John Wiley, New York, NY (US); Dhiraj Bawadhankar, Aurora, IL (US); Samantha Azzarello, New York, NY (US); Fateen Sharaby, Hoboken, NJ (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 605 days.

This patent is subject to a terminal disclaimer.

(21) Appl. No.: 17/020,423

(22) Filed: Sep. 14, 2020

(65) Prior Publication Data

US 2020/0410597 A1 Dec. 31, 2020

Related U.S. Application Data

(63) Continuation of application No. 14/750,422, filed on Jun. 25, 2015, now Pat. No. 10,810,671.

(Continued)

(51) Int. Cl.
*G06Q 40/06* (2012.01)

(52) U.S. Cl.
CPC .................. *G06Q 40/06* (2013.01)

(58) Field of Classification Search
CPC ........ G06Q 40/06; G06Q 40/00; G06Q 40/02; G06Q 40/04; G06Q 50/34; G06Q 40/025; G06T 15/10; G06T 15/205; G06T 2207/30252; G06T 2215/12; G06T 11/206; G06T 15/00; G06T 15/04; G06T 15/20;

(Continued)

(56) References Cited

U.S. PATENT DOCUMENTS

| 5,068,816 A | 11/1991 | Noetzel |
| 5,274,813 A | 12/1993 | Itoh |

(Continued)

FOREIGN PATENT DOCUMENTS

WO 0150776 A2 7/2001

OTHER PUBLICATIONS

EP Examination Report in EP15174114.7, dated Jun. 13, 2018, 7 pages.

(Continued)

*Primary Examiner* — Slade E Smith
(74) *Attorney, Agent, or Firm* — Lempia Summerfield Katz LLC

(57) ABSTRACT

A computer system may access data corresponding to a portfolio that comprises interest rate swaps and may calculate parameters for a compressed swap. The computer system may determine, based at least in part on the parameters for the compressed swap, a performance bond requirement attributable to the interest rate swaps. The computer system may compare the performance bond requirement to account data associated with a holder of the portfolio and may perform one or more additional actions based on the comparing.

21 Claims, 4 Drawing Sheets

Related U.S. Application Data

(60) Provisional application No. 62/018,272, filed on Jun. 27, 2014.

(58) Field of Classification Search
CPC ........ B60R 2300/607; B60R 2300/105; B60R 1/00; B60R 2300/303; B60R 2300/207; B60R 2300/30; B60R 2300/305; B60R 2300/404; B60R 2300/806; B60R 2300/8086; B60R 2300/60; B60R 2300/605; H04N 7/181; H04N 13/111; H04N 7/18; G06G 7/52; G07F 7/10; G07F 17/3288; G09B 9/05; G03B 37/04; G06F 3/04815; G06J 1/00
USPC .......................................................... 705/36 R
See application file for complete search history.

(56) References Cited

U.S. PATENT DOCUMENTS

| | | | |
|---|---|---|---|
| 5,978,511 A | 11/1999 | Horiuchi | |
| 6,064,985 A | 5/2000 | Anderson | |
| 6,278,981 B1 | 8/2001 | Dembo et al. | |
| 6,282,520 B1 | 8/2001 | Schirripa | |
| 6,304,858 B1 | 10/2001 | Mosler | |
| 6,317,727 B1 | 11/2001 | May | |
| 6,333,788 B1 | 12/2001 | Yamada | |
| 6,385,249 B1 | 5/2002 | Kondo | |
| 6,424,972 B1 | 7/2002 | Berger | |
| 7,222,317 B1 | 5/2007 | Mathur | |
| 7,236,952 B1 | 6/2007 | D Zmura | |
| 7,349,878 B1 | 3/2008 | Makivic | |
| 7,430,539 B2 | 9/2008 | Glinberg | |
| 7,509,275 B2 | 3/2009 | Glinberg | |
| 7,580,876 B1 | 8/2009 | Phillips | |
| 7,587,641 B1 | 9/2009 | Sloane | |
| 7,734,538 B2 | 6/2010 | Bauerschmidt | |
| 7,739,186 B1 * | 6/2010 | Gerber | G06Q 20/10 705/37 |
| 7,822,668 B1 | 10/2010 | Benda | |
| 7,870,052 B1 | 1/2011 | Goldberg | |
| 8,001,022 B2 * | 8/2011 | Kastel | G06Q 40/06 705/37 |
| 8,108,281 B2 | 1/2012 | Koblas | |
| 8,165,942 B1 | 4/2012 | Rordorf | |
| 8,301,537 B1 | 10/2012 | Rachev | |
| 8,515,058 B1 | 8/2013 | Gentry | |
| 8,639,606 B1 * | 1/2014 | Shakarchi | G06Q 40/04 705/37 |
| 8,805,735 B1 | 8/2014 | Goldberg | |
| 8,862,560 B1 | 10/2014 | Wu | |
| 9,396,131 B1 * | 7/2016 | Hendry | G06F 3/0647 |
| 10,810,671 B2 * | 10/2020 | Boberski | G06Q 40/06 |
| 2002/0002528 A1 | 1/2002 | Terada | |
| 2002/0038272 A1 | 3/2002 | Menchero | |
| 2002/0099640 A1 * | 7/2002 | Lange | G07F 17/3288 705/37 |
| 2002/0107774 A1 * | 8/2002 | Henninger | G06Q 40/06 705/37 |
| 2002/0138386 A1 | 9/2002 | Maggioncalda | |
| 2003/0036918 A1 | 2/2003 | Pintsov | |
| 2003/0055777 A1 | 3/2003 | Ginsberg | |
| 2003/0061577 A1 | 3/2003 | Saluja | |
| 2003/0101026 A1 | 5/2003 | Rabinowitz | |
| 2003/0154153 A1 * | 8/2003 | Steidlmayer | G06Q 40/02 705/37 |
| 2003/0236738 A1 | 12/2003 | Lange | |
| 2004/0177023 A1 | 9/2004 | Krowas | |
| 2004/0186804 A1 | 9/2004 | Chakraborty | |
| 2004/0199448 A1 | 10/2004 | Chalermkraivuth | |
| 2004/0205457 A1 | 10/2004 | Bent | |
| 2004/0220870 A1 | 11/2004 | Lundberg | |
| 2004/0225593 A1 * | 11/2004 | Frankel | G06Q 40/04 705/37 |
| 2005/0050372 A1 | 3/2005 | Hagiwara | |
| 2005/0055301 A1 | 3/2005 | Cohen | |
| 2005/0096950 A1 | 5/2005 | Caplan | |
| 2005/0108128 A1 * | 5/2005 | Kastel | G06Q 40/04 705/35 |
| 2005/0234795 A1 * | 10/2005 | Hodes | G06Q 40/10 705/36 R |
| 2006/0059067 A1 | 3/2006 | Glinberg | |
| 2006/0112049 A1 | 5/2006 | Mehrotra | |
| 2006/0224492 A1 * | 10/2006 | Pinkava | G06Q 40/02 705/37 |
| 2006/0224494 A1 | 10/2006 | Pinkava | |
| 2006/0259378 A1 | 11/2006 | Fornasari | |
| 2007/0033123 A1 | 2/2007 | Navin | |
| 2007/0055599 A1 * | 3/2007 | Arnott | G06Q 40/00 705/35 |
| 2007/0055609 A1 * | 3/2007 | Whitehurst | G06Q 40/04 705/37 |
| 2007/0083586 A1 | 4/2007 | Luo | |
| 2007/0156555 A1 | 7/2007 | Orr | |
| 2007/0186206 A1 | 8/2007 | Abrams | |
| 2007/0198387 A1 | 8/2007 | Uenohara | |
| 2007/0203855 A1 * | 8/2007 | Fisher | G06Q 40/06 705/36 R |
| 2007/0244785 A1 | 10/2007 | Williams | |
| 2007/0271204 A1 | 11/2007 | Jiang | |
| 2007/0288351 A1 * | 12/2007 | Huntley | G06Q 40/04 705/37 |
| 2008/0120251 A1 | 5/2008 | Tyagi | |
| 2008/0167981 A1 * | 7/2008 | Whitehurst | G06Q 40/02 705/37 |
| 2008/0183613 A1 * | 7/2008 | Frankel | G06Q 40/04 705/37 |
| 2008/0183615 A1 * | 7/2008 | Rio | G06Q 40/04 705/37 |
| 2008/0196076 A1 | 8/2008 | Shatz | |
| 2008/0235172 A1 | 9/2008 | Rosenstein | |
| 2008/0243721 A1 * | 10/2008 | Joao | G06Q 40/00 705/36 R |
| 2008/0249952 A1 * | 10/2008 | Benteler | G06Q 40/06 705/36 R |
| 2008/0249954 A1 * | 10/2008 | Gleyzer | G06Q 40/04 705/36 R |
| 2008/0249956 A1 * | 10/2008 | Connors | G06Q 40/04 705/36 R |
| 2008/0249958 A1 * | 10/2008 | Anguish | G06Q 40/04 705/37 |
| 2008/0288297 A1 * | 11/2008 | Koo | G06Q 40/08 705/35 |
| 2008/0294571 A1 | 11/2008 | Maloney | |
| 2008/0319920 A1 | 12/2008 | Levin | |
| 2009/0138536 A1 | 5/2009 | Chao | |
| 2009/0157561 A1 * | 6/2009 | Hadi | G06Q 40/06 705/36 R |
| 2009/0171826 A1 * | 7/2009 | Hadi | G06Q 40/00 705/35 |
| 2009/0216824 A1 | 8/2009 | Weinberg | |
| 2009/0248564 A1 | 10/2009 | Fallon | |
| 2009/0265284 A1 | 10/2009 | Rowell | |
| 2009/0281956 A1 | 11/2009 | An | |
| 2009/0299910 A1 | 12/2009 | Khuong-huu | |
| 2009/0307124 A1 | 12/2009 | Meyerhoff, II | |
| 2010/0063942 A1 * | 3/2010 | Arnott | G06Q 40/10 705/37 |
| 2010/0094746 A1 * | 4/2010 | MacGregor | G06Q 40/04 705/37 |
| 2010/0106633 A1 * | 4/2010 | Iyer | G06Q 40/03 705/35 |
| 2010/0131306 A1 * | 5/2010 | Koo | G06Q 40/08 705/37 |
| 2010/0138362 A1 * | 6/2010 | Whitehurst | G06Q 40/04 705/37 |
| 2010/0145841 A1 * | 6/2010 | Iyer | G06Q 40/04 705/37 |
| 2010/0145875 A1 | 6/2010 | Schmid | |
| 2010/0191628 A1 * | 7/2010 | Arnott | G06Q 40/00 705/30 |

(56) References Cited

U.S. PATENT DOCUMENTS

| | | | |
|---|---|---|---|
| 2010/0259204 A1 | 10/2010 | Imura | |
| 2010/0280970 A1* | 11/2010 | Lai | G06Q 40/06 705/36 R |
| 2010/0281086 A1 | 11/2010 | Ganai | |
| 2010/0323350 A1 | 12/2010 | Gordon | |
| 2010/0328530 A1 | 12/2010 | Hashimoto | |
| 2010/0332370 A1* | 12/2010 | Lindblom | G06Q 40/06 705/37 |
| 2011/0004568 A1* | 1/2011 | Phillips | G06Q 40/06 705/36 R |
| 2011/0035342 A1 | 2/2011 | Koblas | |
| 2011/0060603 A1 | 3/2011 | Capelli | |
| 2011/0137686 A1* | 6/2011 | Mott | G06Q 40/04 705/36 R |
| 2011/0153521 A1* | 6/2011 | Green | G06Q 40/06 705/36 R |
| 2011/0161244 A1* | 6/2011 | Iyer | G06Q 40/04 705/37 |
| 2011/0221489 A1 | 9/2011 | Tarng | |
| 2012/0047058 A1* | 2/2012 | Wilson, Jr. | G06Q 99/00 705/37 |
| 2012/0072370 A1* | 3/2012 | Marcus | G06Q 40/04 705/37 |
| 2012/0221487 A1* | 8/2012 | Michalowski | G06Q 40/08 705/36 R |
| 2012/0296793 A1* | 11/2012 | Wilson, Jr. | G06Q 40/04 705/37 |
| 2012/0296798 A1* | 11/2012 | Riddle, Jr. | G06Q 40/04 705/37 |
| 2012/0296843 A1* | 11/2012 | Saccone | G06Q 40/06 705/36 R |
| 2013/0006891 A1* | 1/2013 | Brazdzionis | G06Q 40/06 705/36 R |
| 2013/0018769 A1 | 1/2013 | Boudreault | |
| 2013/0018818 A1 | 1/2013 | Yadav | |
| 2013/0036074 A1 | 2/2013 | Kaestel | |
| 2013/0041799 A1* | 2/2013 | Nyhoff | G06Q 40/04 705/37 |
| 2013/0041843 A1* | 2/2013 | Nyhoff | G06Q 40/06 705/36 R |
| 2013/0117197 A1 | 5/2013 | Shah | |
| 2013/0132163 A1* | 5/2013 | Eder | G06Q 40/03 705/7.37 |
| 2013/0132301 A1* | 5/2013 | Abreu | G06Q 40/06 705/36 R |
| 2013/0191268 A1* | 7/2013 | Skyrm | G06Q 40/04 705/37 |
| 2013/0218804 A1* | 8/2013 | Kalotay | G06Q 40/06 705/36 R |
| 2013/0226706 A1* | 8/2013 | Haggerty | G06Q 40/02 705/14.66 |
| 2013/0226778 A1* | 8/2013 | Haggerty | G06Q 40/02 707/E17.014 |
| 2013/0226779 A1* | 8/2013 | Haggerty | G06Q 40/02 705/38 |
| 2013/0226780 A1* | 8/2013 | Haggerty | G06Q 40/02 705/38 |
| 2013/0226781 A1* | 8/2013 | Haggerty | G06Q 40/06 705/38 |
| 2013/0226782 A1* | 8/2013 | Haggerty | G06Q 40/02 705/38 |
| 2013/0226783 A1* | 8/2013 | Haggerty | G06Q 30/02 705/38 |
| 2013/0241933 A1 | 9/2013 | Thatcher | |
| 2013/0282554 A1 | 10/2013 | Boberski | |
| 2013/0339272 A1 | 12/2013 | Willism, III | |
| 2014/0023167 A1 | 1/2014 | Meyer | |
| 2014/0032443 A1* | 1/2014 | Ossanna | G06Q 40/06 705/36 R |
| 2014/0136446 A1* | 5/2014 | Golan | G06Q 40/06 705/36 R |
| 2014/0229351 A1* | 8/2014 | Lutnick | G06Q 40/04 705/37 |
| 2014/0244469 A1* | 8/2014 | Aron | G06Q 40/04 705/37 |
| 2014/0258072 A1 | 9/2014 | Mayor | |
| 2014/0279369 A1* | 9/2014 | Turner | G06Q 40/06 705/37 |
| 2014/0279370 A1* | 9/2014 | Turner | G06Q 40/06 705/37 |
| 2014/0289164 A1* | 9/2014 | Hirani | G06Q 40/06 705/36 R |
| 2014/0297504 A1* | 10/2014 | Bergenudd | G06Q 40/04 705/37 |
| 2015/0063374 A1 | 3/2015 | Venkatachalam Jayaraman | |
| 2015/0324914 A1 | 11/2015 | Zhan et al. | |
| 2015/0365619 A1 | 12/2015 | Mayer | |
| 2016/0246266 A1 | 8/2016 | Kniazev | |
| 2016/0285571 A1 | 9/2016 | Badiu | |
| 2017/0061329 A1 | 3/2017 | Kobayashi | |

OTHER PUBLICATIONS

Extended EP Search Report in EP15191983, dated Dec. 17, 2015, 6 pages.
Extended European Search Report in EP15174114.7, dated Nov. 4, 2015, 6 pages.
International Search Report and Written Opinion in International Patent Application No. PCT/US2015/029941, dated Aug. 10, 2015, 2 pages.

* cited by examiner

INTEREST RATE SWAP COMPRESSION

CROSS REFERENCE TO RELATED APPLICATIONS

This application is a continuation under 37 C.F.R. § 1.53(b) of U.S. patent application Ser. No. 14/750,422 filed Jun. 25, 2015 now U.S. Pat. No. 10,810,671, which claims the benefit of the filing date under 35 U.S.C. § 119(e) U.S. Provisional Patent Application Ser. No. 62/018,272, filed Jun. 27, 2014, the entire disclosures of which are hereby incorporated by reference.

BACKGROUND

An interest rate swap is a type of over-the-counter (OTC) product in which parties agree to exchange streams of future interest payments based on a specified principal or notional amount. Each stream may be referred to as a leg. Swaps are often used to hedge certain risks, but they may also be used for speculative purposes.

An example of an interest rate swap includes a plain fixed-to-floating, or "vanilla," swap. A vanilla swap includes an exchange of an interest stream based on a floating rate and an interest stream based on a fixed rate. In a vanilla swap, a first party makes periodic interest payments to a second party based on the floating interest rate and receives interest payments from the second party based on the fixed interest rate. Conversely, the second party receives periodic interest payments from the first party based on the floating interest rate and makes interest payments to the first party based on the fixed interest rate. The fixed and floating rate payments are based on a common notional amount. Over the life of the swap, the floating rate may be periodically reset to a rate published by a known source of short-term interest rates, e.g., the London InterBank Offered Rate (LIBOR).

Streams of payments under a swap may extend well into the future (e.g., 10 years or more). Parties may accumulate large portfolios of swaps. As such, financial institutions, such as a financial exchange, a bank, an investment broker, etc. may face an increased need for data storage and/or computing capacity to manage one or more of these large portfolios of swaps. For various reasons, it would be desirable to condense multiple swaps in a portfolio into a single hypothetical swap that has characteristics similar to the portfolio swaps.

SUMMARY

This Summary is provided to introduce a selection of concepts in a simplified form that are further described below in the Detailed Description. This Summary is not intended to identify key features or essential features of the invention.

In some embodiments, a computer system may access data corresponding to a portfolio that comprises m interest rate swaps, wherein m is an integer greater than one. A financial institution managing the portfolio may have a first data storage capacity large enough to store information associated with the portfolio comprising m interest rate swaps. The accessed data may comprise, for each of the interest rate swaps, a notional value and a fixed rate value. Each of the interest rate swaps may correspond to a common tenor. The computer system may calculate parameters for a compressed swap having a risk value equivalent to a sum of risk values of the interest rate swaps. The parameters may include a compressed swap notional value $N_B$, a compressed swap fixed rate value $x_B$, and a compressed swap floating rate spread value c. The computer system may optionally determine, based at least in part on the compressed swap parameters, a performance bond requirement attributable to the interest rate swaps. The computer system may compare a determined performance bond requirement to account data associated with a holder of the portfolio and may perform one or more additional actions based on the comparing.

A financial institution associated with the portfolio may have one or more computing systems (e.g., servers, data repositories, processors, etc.) that may be used, at least in part, to store or otherwise manage portfolios of the financial institution's clients. These financial institution computing systems may be sized to manage a specified amount of data associated with aspects of the financial institution's business. This may include managing and/or processing information associated with the portfolios. As portfolios become larger for one or more of the financial institution's clients, the data storage capacity and/or processing power necessary to process and/or store this information may approach a storage capacity and/or processing power limit of the currently installed hardware. As such, the financial institution may be required to install more computing devices and/or upgrade existing computing components to handle the additional information storage and/or processing requirements. By monitoring, or otherwise managing the size of one or more portfolios, the financial institution may be able to proactively manage the computing requirements and the associated costs. For example, the financial institution may monitor a size of a client's portfolio. If the portfolio size approaches a threshold, the financial institution computing system may automatically initiate a portfolio compression process. In other cases, the financial institution computing system may provide an indication to an individual, such as a network manager, that the computing system is approaching the limits to allow manual initiation of a portfolio compression process. Alternatively, the computing system may store the portfolio in a compressed form for some or all clients so as to minimize the data storage and processing requirements.

Embodiments include, without limitation, methods for compressing interest rate swaps, computer systems configured to perform such methods and non-transitory computer-readable media storing instructions executable by a computer system to perform such methods.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Various embodiments may comprise a method, a computer system, and/or a computer program product. Accordingly, one or more aspects of one or more of such embodiments may take the form of an entirely hardware embodiment, an entirely software embodiment and/or an embodiment combining software and hardware aspects. Furthermore, such aspects may take the form of a computer program product stored by one or more non-transitory computer-readable storage media having computer-readable program code, or instructions, embodied in or on the storage media. The terms "computer-readable medium" and "computer-readable storage medium" as used herein include not only a single medium or single type of medium, but also a combination of one or more media and/or types of media. Such a non-transitory computer-readable medium may store computer-readable instructions (e.g., software) and/or computer-readable data (i.e., information that may or may not be executable). Any suitable computer readable media may be utilized, including various types of non-transitory computer readable storage media such as hard disks, CD-ROMs, optical storage devices, magnetic storage devices, FLASH memory and/or any combination thereof. The terms "computer-readable medium" and "computer-readable storage medium" could also include an integrated circuit or other device having hard-coded instructions (e.g., logic gates) that configure the device to perform one or more operations.

Aspects of method steps described in connection with one or more embodiments may be executed by one or more processors associated with a computer system (such as exchange computer system 100 described below). As used herein, a "computer system" could be a single computer or could comprise multiple computers. When a computer system comprising multiple computers performs a method, various steps could be performed by different ones of those multiple computers. Processors of a computer system may execute computer-executable instructions stored on non-transitory computer-readable media. Embodiments may also be practiced in a computer system forming a distributed computing environment, with tasks performed by remote processing devices that are linked through a communications network. In a distributed computing environment, program modules may be located in both local and remote computer storage media including memory storage devices.

Exemplary Operating Environment

Figure 1:
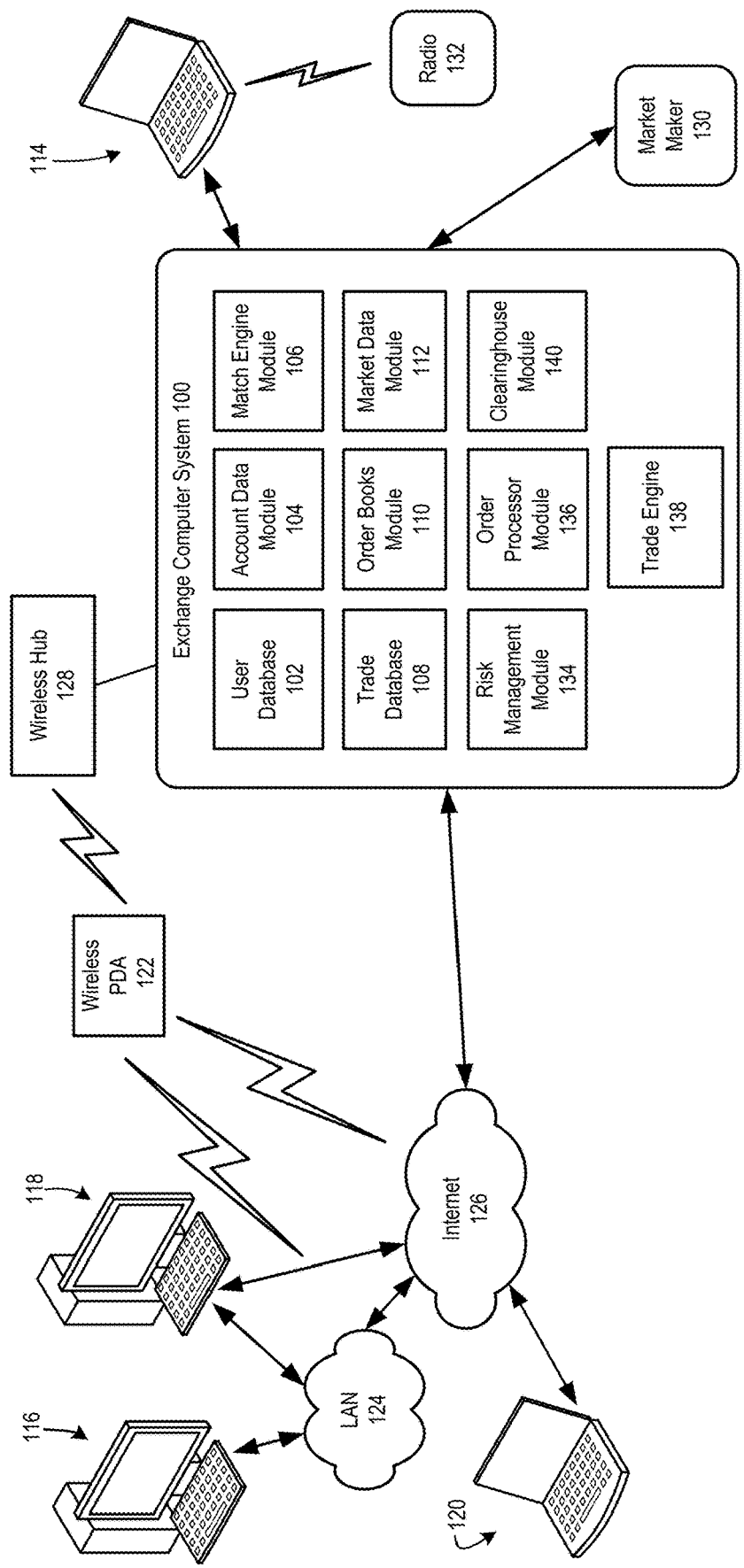
FIG. 1 shows an exemplary trading network environment for implementing trading systems and methods according to at least some embodiments.

Aspects of at least some embodiments can be implemented with computer systems and computer networks that allow users to communicate trading information. An exemplary trading network environment for implementing systems and methods according to at least some embodiments is shown in FIG. 1. The implemented systems and methods can include systems and methods, such as are described herein, that facilitate data processing and other activities associated with compressing interest rate swaps.

Computer system 100 can be operated by a financial product exchange and configured to perform operations of the exchange for, e.g., trading and otherwise processing various financial products. Financial products of the exchange may include, without limitation, futures contracts, options on futures contracts, other types of options, and other types of derivative contracts. Financial products traded or otherwise processed by the exchange may also include over-the-counter (OTC) products such as forwards, OTC options, interest rate swaps, etc. Financial products traded through the exchange may also or alternatively include other types of financial interests, including without limitation stocks, bonds and or other securities (e.g., exchange traded funds), foreign currencies, and spot market trading of commodities.

Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses a 64-bit processor. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options and other derivative products, swap curve data, etc. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 140 may be included as part of exchange computer system 100 and configured to carry out operations of a clearinghouse of the exchange that operates computer system 100. Module 140 may receive data from and/or transmit data to trade database 108 and/or other modules of computer system 100 regarding trades of futures contracts, futures contracts options, swaps, and other financial products traded through the exchange that operates system 100. Clearinghouse module 140 may facilitate the financial product exchange (or a clearinghouse of the exchange) acting as one of the parties to every traded contract or other product. For example, parties A and B may agree, either bilaterally or by matching of orders submitted to computer system 100, to become counterparties to a swap or other type of financial product. Module 140 may then create an exchange-traded financial product between party A and the exchange clearinghouse and a second exchange-traded financial product between the exchange clearinghouse and party B. Module 140 may similarly create offsetting contracts when creating contracts as a result of an option exercise and/or may select option grantors to fulfill obligations of exercising option holders. Module 140 may also be configured to perform other clearinghouse operations. As a further example, module 140 may maintain margin data with regard to clearing members and/or trading customers. As part of such margin-related operations, module 140 may store and maintain data regarding the values of various options, futures contracts and other interests, determine mark-to-market and final settlement amounts, confirm receipt and/or payment of amounts due from margin accounts, confirm satisfaction of delivery and other final settlement obligations, etc.

Each of modules 102 through 140 could be implemented as separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-140). When one or more of modules 102 through 140 are implemented as separate computers in a networked environment, those computers may be part of a local area network, a wide area network, and/or multiple interconnected local and/or wide area networks.

Exchange computer system 100 may also communicate in a variety of ways with devices that may be logically distinct from computer system 100. For example, computer device 114 is shown directly connected to exchange computer system 100. Exchange computer system 100 and computer device 114 may be connected via a T1 line, a common local area network (LAN) or other mechanism for connecting computer devices. Also shown in FIG. 1 is a radio 132. The user of radio 132 (e.g., a trader or exchange employee) may transmit orders or other information to a user of computer device 114. The user of computer device 114 may then transmit those orders or other information to exchange computer system 100 using computer device 114.

Computer devices 116 and 118 are coupled to a LAN 124 and may communicate with exchange computer system 100 via LAN 124. LAN 124 may implement one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics, radio links or other media.

A wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet. Computers 116, 118 and 120 may communicate with each other via the Internet 126 and/or LAN 124.

One or more market makers 130 may maintain a market by providing constant bid and offer prices for a derivative or security to exchange computer system 100. Exchange computer system 100 may also include trade engine 138. Trade engine 138 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include, without limitation, additional clearing systems, regulatory systems and fee systems.

The operations of computer devices and systems shown in FIG. 1 and described herein may be controlled by computer-executable instructions stored on one or more non-transitory computer-readable media. For example, computer device 116 may include computer-executable instructions for receiving market data from exchange computer system 100 and displaying that information to a user. As another example, module 140 and/or other modules of exchange computer system 100 may include one or more non-transitory computer-readable media storing computer-executable instructions for performing herein-described operations.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

In at least some embodiments, exchange computer system 100 (or "computer system 100") receives, stores, generates and/or otherwise processes data in connection with compressing interest rate swaps in a portfolio. For convenience, the term "swap" is used herein as a shorthand reference to an interest rate swap.

Large portfolios of swaps are common, and a party may enter into one or more swaps to hedge positions in one or more markets. Generally, an available fixed rate dictates the price of a swap. The fixed rate at which a swap might be entered generally changes over time. For example, a dealer may quote a swap at a first fixed rate at a time 0. A short time later, the same dealer may provide a quote for a similar swap, but having a second fixed rate that is different than the first fixed rate. Once a swap is entered, the fixed rate will remain fixed for the lifetime of the swap. Over time, party may develop a portfolio of swaps. In some of those swaps, the party may pay the fixed rate leg of the swap. In others of those swaps the party may pay the floating rate leg of the swap. Typically, few or no swaps in a portfolio have the same fixed interest rates. As a result, few (if any) of those swaps net out, and a large number of swap positions remain open on the accounting database associated with the party holding those swap positions.

A large number of swaps can result in a substantial performance bond requirement, even if such swaps are roughly split between swaps in which the portfolio holder pays the fixed rate and swaps in which the portfolio holder receives the fixed rate. For example, a portfolio may include a first swap in which the portfolio holder pays fixed rate R1 on a $100 million notional and a second swap in which the portfolio holder receives fixed rate R2 on a $100 million notional. Because R1≠R2, these swaps do not net out, and a performance bond requirement for the portfolio may be calculated based on the $200 million gross notional amount.

In some embodiments, a computer system may analyze multiple swaps in a portfolio. Based on that analysis, the computer system may then calculate parameters of a single hypothetical compressed swap that has values for one or more risk metrics that are equivalent to a sum (or sums) of such risk metrics for the actual swaps, and that has a net present value equivalent to the combined net present values of the actual swaps. A performance bond requirement for the hypothetical compressed swap may be lower than a performance bond requirement calculated based on the actual swaps.

Figure 2:
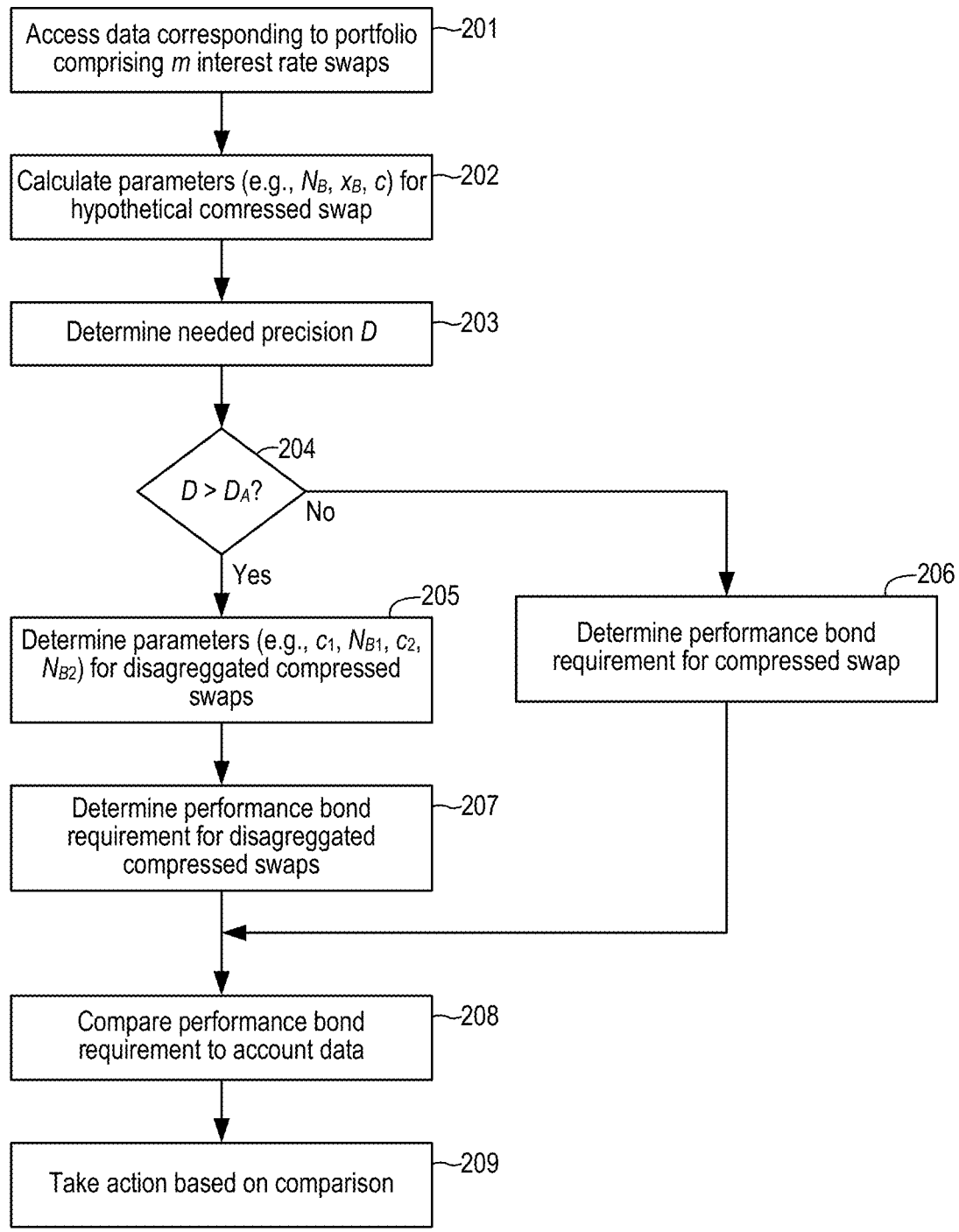
FIG. 2 is a flow chart showing operations performed, according to some embodiments, in connection with calculating parameters for a hypothetical condensed swap.

FIG. 2 is a flow chart showing operations performed by computer system 100, according to some embodiments, in connection with calculating parameters for a hypothetical condensed swap. The following description of some embodiments refers to operations performed by clearinghouse module 140. In other embodiments, however, some or all of these operations may be performed by other modules of computer system 100 and/or by modules of one or more other computer systems.

In step 201, module 140 accesses data corresponding a portfolio that includes m swaps, where m is an integer greater than one. For each of the m swaps, a first counterparty ("fixed payor") makes payments at a fixed interest rate payment based on a swap notional amount and receives payments at a floating interest rate based on that same notional amount, while a second counterparty ("fixed receiver") receives payments at the fixed interest rate based on that notional amount and makes payments at the floating rate based on that notional amount. The notional and/or the fixed rate may be different for some or all of the m swaps. For some of the m swaps, the portfolio holder may be the fixed payor, while in others the portfolio holder may be the fixed receiver. The floating rate in each of the m swaps may be based on the same source, e.g., the London InterBank Offered Rate. The data accessed in step 201 may include, for each of the m swaps, the nature of the portfolio holder position (fixed payor or fixed receiver), the notional amount, the fixed rate, the source of the floating rate, the tenor of the swap (e.g., the date on which the final fixed and floating payments are due), the fixed and floating payment dates, etc. In some embodiments, a single tenor is common to all of the m swaps. Table 1 includes information for fifteen swaps (m=15) according to one example.

TABLE 1

| Swap no. | Fixed rate, per annum (%) | Notional ($) |
| --- | --- | --- |
| 1 | 3 | −100,000,000 |
| 2 | 3.5 | 99,000,000 |
| 3 | 3.1 | −1,200,000 |
| 4 | 2.9 | 15,600,000 |
| 5 | 3.101 | 30,000,000 |
| 6 | 3.2 | 16,500,000 |
| 7 | 2.9545 | 33,470,000 |
| 8 | 3.241 | 20,000,000 |
| 9 | 3.2254 | −1,500,000 |
| 10 | 3.4591 | 45,000,000 |
| 11 | 3.0125 | −17,250,000 |
| 12 | 3.225 | 165,432,100 |
| 13 | 2.1975 | −87,542,100 |
| 14 | 1.841 | −155,210,000 |
| 15 | 3.1478 | −38,210,000 |

In the example of Table 1, each of the swaps has a 10 year tenor and ends on May 13, 2024. The floating rate for each swap is the 3-month LIBOR. A negative value for notional amount indicates a fixed rate payor position in a swap. A positive value for notional amount indicates a fixed rate receiver position in a swap.

Figure 3:
FIG. 3 is a chart showing swap curve data for an example set of swaps.

As part of step 201, module 140 may access other data that includes additional values associated with the m swaps. Such additional data may include, e.g., a swap curve. Swap curves and methods of generating data for swap curves are well known. FIG. 3 is a chart that includes swap curve data for the example swaps of Table 1. Column 301 identifies settlement dates on which fixed and/or floating payments are made. For the example swaps of Table 1, it is assumed that fixed rate payments are made semi-annually (e.g., on Nov. 12, 2014, on May 12, 2015, on Nov. 12, 2015, etc.) and that floating rate payments are made quarterly (e.g., on Aug. 12, 2014, on Nov. 12, 2014, on Feb. 12, 2015, on May 12, 2015, etc.). Each row in FIG. 3 thus represents a different floating rate payment period. Column 302 includes year fractions applicable to each of the floating rate payment periods. Because of weekends and/or holidays that may require postponement of a settlement date until a next business day, and because some months are shorter than others, some floating rate payment periods are slightly less than or greater than a quarter of a year. Column 303 includes floating rates applicable to each of the floating rate payment periods. For example, the floating rate applicable to the floating rate payment period settling Aug. 12, 2014 is shown in FIG. 3 as 0.23%. The rates are indicated in column 303 in a per annum format. Column 304 includes discount factors applicable to each of the floating rate payment periods.

In step 202, module 140 calculates parameters for a hypothetical compressed swap based on the m swaps. In at least some embodiments, the compressed swap may have a hypothetical present value that is equivalent to the combined present values of the m swaps. As used herein, "equivalent" means equal or nearly equal (e.g., plus or minus a few percent). The compressed swap may also or alternatively have corresponding values for risk-related metrics that are equivalent to the sums of those risk metric values corresponding to the m swaps.

The parameters calculated in step 202 may include a compressed swap notional value $N_B$, a compressed swap fixed rate value $x_B$, and a compressed swap floating rate spread value c. In some embodiments, the compressed swap has the common tenor of the m swaps. If $N_B$ is positive, the portfolio holder is assumed to receive payments under the compressed swap at fixed rate $x_B$ based on notional $N_B$ and to make floating rate payments, based on notional $N_B$, at a floating rate that is greater than the floating rate of the m swaps by an amount c (e.g., the applicable LIBOR increased by c). If $N_B$ is negative, the portfolio holder is assumed to make payments at fixed rate $x_B$ based on notional $N_B$ and to receive floating rate payments, based on notional $N_B$, at a floating rate that is greater than the floating rate of the m swaps by an amount c. In some embodiments, $x_B$, $N_B$, and c are calculated according to Equations 1 through 3.

$$x_B = \frac{1}{m}\sum_{j=1}^{m} x_j \qquad \text{Equation 1}$$

$$N_B = \frac{\sum_{j=1}^{m} N_j x_j}{x_B} \qquad \text{Equation 2}$$

$$c = \frac{1}{\sum_{g=1}^{G} df_g dt_g} \left[ \frac{\sum_{j=1}^{m} x_j \sum_{j=1}^{m} N_j \sum_{g=1}^{G} f_g df_g dt_g}{m\sum_{j=1}^{m} N_j x_j} - \sum_{g=1}^{G} f_g df_g dt_g \right] \qquad \text{Equation 3}$$

In Equations 1 through 3, and in subsequently described equations and inequalities, m is the number of swaps for which data was accessed in step 1, j is an index to one of the m swaps, $x_j$ is the fixed rate value for the $j^{th}$ swap, $N_j$ is the notional of the $j^{th}$ swap, G is the number of floating rate payment periods, g is an index to one of the G floating rate payment periods, $f_g$ is the floating rate applicable to the $g^{th}$ floating rate payment period, $df_g$ is the floating rate discount factor applicable to the $g^{th}$ floating rate payment period, and $dt_g$ is the duration of the $g^{th}$ floating rate payment period. The derivation of Equation 3 is explained below. As also explained below, a compressed swap having parameters $x_B$, $N_B$, and c calculated according to Equations 1 through 3 has a present value equivalent to the combined present values of the m swaps.

Returning to the example swaps of Table 1, and using the corresponding swap curve data in FIG. 3, a hypothetical compressed swap has an $x_B$ value of 3.007%, an $N_B$ value of $143,511,976, and c value of 0.556%. Under that compressed swap, the portfolio holder would be assumed to receive fixed rate payments at a rate of 3.007% based on a $143,511,976 notional and to make floating rate payments at LIBOR+c based on that $143,511,976 notional. As shown below in Table 2, the net present value of that compressed swap (CS) is equivalent to the sum of the net present values of the swaps.

TABLE 2

| Swap | NPV ($) | DV01 | CV01 |
|---|---|---|---|
| 1 | −2,898,889.57 | −91,649.84 | −871,394 |
| 2 | 7,382,323.11 | 93,003.96 | 877,801 |
| 3 | −45,725.88 | −1,105.30 | −10,493 |
| 4 | 310,017.10 | 14,225.82 | 135,461 |
| 5 | 1,145,881.82 | 27,633.94 | 262,344 |
| 6 | 779,144.94 | 15,273.60 | 144,788 |
| 7 | 831,432.07 | 30,605.35 | 291,190 |
| 8 | 1,019,169.35 | 18,551.07 | 175,751 |
| 9 | −74,304.56 | −1,390.26 | −13,174 |
| 10 | 3,187,821.34 | 42,190.10 | 398,438 |
| 11 | −519,714.84 | −15,819.49 | −150,381 |
| 12 | 8,188,873.52 | 153,325.68 | 1,452,935 |
| 13 | 3,866,475.77 | −77,009.64 | −741,376 |
| 14 | 11,899,267.99 | −133,998.0 | −1,297,540 |
| 15 | −1,622,486.43 | −35,278.46 | −334,685 |
| SUM | 33,449,285.73 | 38,558.47 | 319,664.33 |
| CS | 33,449,285.73 | 38,558.47 | 319,664.33 |

Table 2 also includes columns for DV01 and CV01 values. A DV01 value is a dollar value of a basis point and reflects a change in swap present value resulting from a one basis point shift in a swap curve. The CV01 value is the portion of the price change in the actual swap that is not reflected in the DV01 value. Because DV01 is a linear estimate of price change, there will be a gap between the actual price change of a convex instrument like a swap and a DV01 estimate. This gap is estimated by CV01, the second measure of price sensitivity. Put another way, DV01 is the first derivative of price/yield and CV01 is the second derivative. DV01 and CV01 are two metrics often used to assess risk of a swap. As seen in Table 2, the DV01 value for the compressed swap is equal to the sum of the DV01 values of swaps 1 through 15. Similarly, the CV01 value for the compressed swap is equal to the sum of the CV01 values of swaps 1 through 15.

Additional aspects of the above-described compression method are also notable. In some embodiments, the fixed rate $x_B$ of the compressed swap may be determined using techniques other than by a simple average. As the amount of the amount of the fixed rate $x_B$ varies, other values will be affected as indicated in Table 3.

TABLE 3

|  | $x_B$ rises | $x_B$ falls |
|---|---|---|
| $N_B$ | falls | rises |
| c | rises | falls |
| compressed swap net present value | falls | rises |
| compressed swap up-front payment/notional | rises | falls |

Returning to FIG. 2, in step 203 module 140 determines a needed precision for the value c. In some embodiments, certain aspects of computer system 100 or another computer system performing operations in connection with a compressed swap may only be capable of delivering messages or otherwise processing with a fixed precision (e.g., six digits). However, there may be no such limitation on the types of swaps that may be in a given portfolio, and parties may enter into swaps that specify fixed rates using more digits than are supported by some aspects of computer system 100. This may lead to unacceptable imprecision. For example, it may be necessary to specify a compressed swap floating rate ($f_G$+c) with ten digits in order for the net present value and risk of the compressed swap to be equivalent to m swaps in a portfolio. If the floating rate is truncated or rounded to six digits when calculating a performance bond requirement, that requirement may be based on a hypothetical swap that less accurately models the risk and net present value of actual swaps in the portfolio.

In some embodiments, module 140 determines required precision using Equation 4.

$$D = \left\lfloor \log \left( \frac{1}{\left[ \frac{\left[ E + \sum_{g=1}^{G} f_g df_g dt_g \right]}{\left[ \sum_{j=1}^{m} N_j - \frac{m \sum_{j=1}^{m} N_j x_j}{\sum_{j=1}^{m} x_j} \right]} \right]} - c \right) \right\rfloor \quad \text{Equation 4}$$

In Equation 4, and in subsequently described equations and inequalities, D is an integer value representing the number of digits of needed precision necessary for the compressed swap to accurately model the risk and net present values of the m swaps, E is a value chosen to limit the difference between net present value of the compressed swap and the combined net present values of the m swaps, and the "⌊ ⌋" brackets represent a floor function in which the result is the largest integer value less than or equal to the argument within those brackets. In some embodiments, E equals 0.01. Derivation of Equation 4 is explained below.

In step 204, module 140 determines if the required precision D is greater than the lowest precision $D_A$ available in one or more components of computer system 100 that will take action based on the compressed swap. In some embodiments, for example, a module 140 may have the ability to perform computations using a precision equal to or greater than D, but other components of module 140 (e.g., hardware and/or software portions of module 140 that determine performance bond requirements and/or compliance with such requirements) may only be able to send or receive messages having data values with precision $D_A$ that may be less than D. If module 140 determines in step 204 that the required precision D is not greater than the available precision $D_A$, the method proceeds to step 206 on the "no" branch. Step 206 is discussed below. If module 140 determines that the required precision D is greater than the available precision $D_A$, the method proceeds to step 205 on the "yes" branch.

In step 205, module 140 identifies parameters $c_1$ and $N_{B1}$ for a first disaggregated swap to represent a first portion of the compressed swap and parameters $c_2$ and $N_{B2}$ for a second disaggregated swap to represent a second portion of the compressed swap. In some embodiments, module 140 selects a $c_1$ value that is greater than the c value but limited to the available precision, as well as a $c_2$ value that is less than the c value but limited to the available precision. In some embodiments, module 140 calculates $c_1$ by truncating c after the $D_A^{th}$ decimal and increasing the $D_A^{th}$ decimal by 1 and calculates $c_2$ by truncating c after the $D_A^{th}$ decimal and decreasing the $D_A^{th}$ decimal by 1. For example, if D=10, $D_A$=6, and c=0.531296742, then $c_1$=0.53130 and $c_2$=0.53128. Also in step 205, module 140 selects values $N_{B1}$ and $N_{B2}$ such that $c_1*N_{B1}+c_2*N_{B2}=c*N_B$, with $N_{B1}+N_{B2}=N_B$. Continuing the example, and assuming $N_B$=$1,000,000, $N_{B1}$=$837,100 and $N_{B2}$=$162,900.

At the conclusion of step 205, module 140 defines the first disaggregated compressed swap based on $x_B$, $c_1$, and $N_{B1}$, i.e., hypothetically receive fixed rate payments at rate $x_B$ on notional $N_{B1}$ and make floating rate payments at ($f_g+c_1$) if $N_{B1}$ is positive or hypothetically make fixed rate payments at rate $x_B$ on notional $N_{B1}$ and receive floating rate payments at ($f_g+c_1$) if $N_{B1}$ is negative. Module 140 similarly defines the second disaggregated compressed swap based on $x_B$, $c_2$, and $N_{B2}$. The summed net present value and risk of the first and second disaggregated compressed swaps are equivalent to the net present value and risk of the compressed swap.

In step 207, in some cases, module 140 may be used to determine a performance bond requirement based on the first and second disaggregated compressed swaps. In some embodiments, a performance bond may be a deposit of cash or other value that a holder of the portfolio including the m swaps must place on deposit in an account of the entity that operates computer system 100. In other embodiments, a performance bond may represent a minimum capital requirement that the portfolio holder must satisfy, but which may not necessarily be in the form of a deposit with the entity that operates computer system 100. The operations of step 206 may be similar to those of conventional methods for determining a performance bond requirement for a swap or portfolio of swaps, but with such methods being performed with regard to the first and second disaggregated compressed swaps instead of the m actual swaps.

If the "no" branch was taken from step 204, module 140 determines a performance bond requirement in step 206 based on the compressed swap. As in step 207, the operations of step 206 may be similar to those in conventional methods for determining a performance bond requirement for a swap or portfolio of swaps, but with such methods being performed with regard to the compressed swap instead of the m actual swaps.

From either step 206 or 207, module 140 proceeds to step 208. In step 208, module 140 compares the determined performance bond requirement with account data for the holder of the portfolio that includes the m swaps. In some embodiments, that account data may include a balance of a deposit account maintained by the portfolio holder in an account designated to hold performance bond funds. In some embodiments, that account data may also or alternatively include data reflecting whether the portfolio holder has submitted evidence to show sufficient capitalization (e.g., through deposits or assets located elsewhere).

In step 209, and based on the comparison of step 208, module 140 takes additional action. That action may include, for example, confirming that the performance bond requirement is satisfied and storing data indicating that satisfaction. That action may alternatively include, based on determining in step 208 that the performance bond requirement is not satisfied, transmitting a communication to the portfolio holder regarding a requirement for amounts on deposit, capitalization, and/or other security to fulfil the performance bond requirement, and/or preventing further trading or other activity until such requirement is fulfilled.

Figure 4:
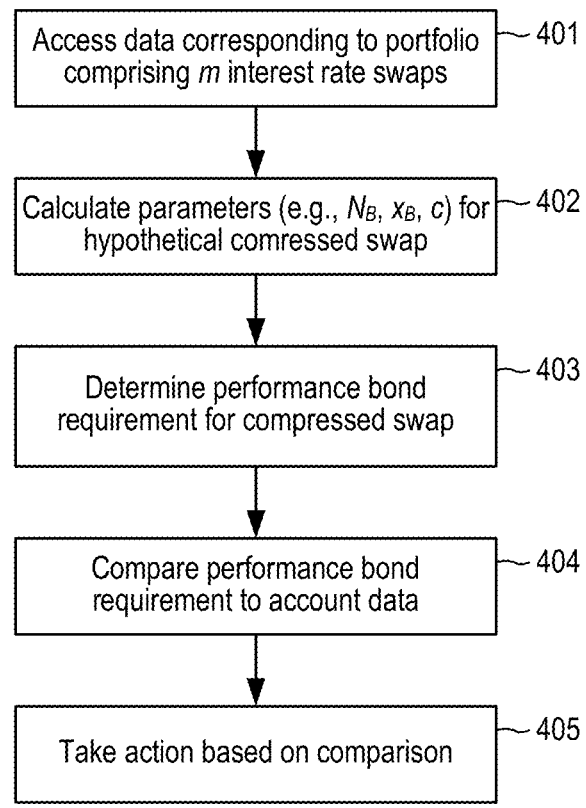
FIG. 4 is a flow chart showing operations performed, according to some additional embodiments, in connection with calculating parameters for a hypothetical condensed swap.

FIG. 4 is a flow chart showing operations performed by computer system 100, according to some additional embodiments, in connection with calculating parameters for a hypothetical condensed swap. In the embodiment of FIG. 4, disaggregated compressed swaps are not considered. Steps 401 through 405 are respectively similar to steps 201, 202, 206, 208, and 209 of FIG. 2.

NPV of Compressed Swap and of m Swaps

In general, a net present value S of each of the m swaps can be described by Equation 5.

$$S_j = N_j \left( x_j \sum_{i=1}^{n} df_i dt_i + \sum_{g=1}^{G} f_g df_g dt_g \right) \quad \text{Equation 5}$$

In Equation 5, and in subsequently described equations and inequalities, n is the number of fixed rate payment periods for the $j^{th}$ swap, i is an index to one of the n fixed rate payment periods, $df_i$ is the fixed rate discount factor applicable to the $i^{th}$ fixed rate payment period, and $dt_i$ is the duration of $i^{th}$ fixed rate payment period. Equation 5 is based on a convention in which a notional value is positive for a fixed rate receiver and negative for a fixed rate payer.

The sum of the net present values for each of the m swaps, $S_1+S_2+\ldots+S_m$ can be represented as shown below in Equations 6.

$$S_1 + S_2 + \ldots + S_m = N_1 \left( x_1 \sum_{i=1}^{n} df_i dt_i + \sum_{g=1}^{G} f_g df_g dt_g \right) + \ldots + \quad \text{Equation 6}$$

$$N_m \left( x_m \sum_{i=1}^{n} df_i dt_i + \sum_{g=1}^{G} f_g df_g dt_g \right) =$$

$$N_1 x_1 \sum_{i=1}^{n} df_i dt_i + N_1 \sum_{g=1}^{G} f_g df_g dt_g + \ldots +$$

$$N_m x_m \sum_{i=1}^{n} df_i dt_i + N_m \sum_{g=1}^{G} f_g df_g dt_g =$$

$$N_1 x_1 \sum_{i=1}^{n} df_i dt_i + \ldots + N_m x_m \sum_{i=1}^{n} df_i dt_i +$$

$$N_1 \sum_{g=1}^{G} f_g df_g dt_g + \ldots +$$

$$N_m \sum_{g=1}^{G} f_g df_g dt_g =$$

$$\sum_{j=1}^{m} N_j x_j \sum_{i=1}^{n} df_i dt_i + \sum_{j=1}^{m} N_j \sum_{g=1}^{G} f_g df_g dt_g$$

The net present value of a compressed swap having parameters $x_B$, $N_B$, and c as set forth in Equations 1 through 3 can be represented by Equation 7.

$$S_B = N_B\left(x_B \sum_{i=1}^{n} df_i dt_i + \sum_{g=1}^{G} (f_g + c) df_g dt_g\right) \quad \text{Equation 7}$$

As shown below in Equations 8, the net present value of the compressed swap is the same as the sum of the net present values of the m swaps.

$$S_B = N_B\left(x_B \sum_{i=1}^{n} df_i dt_i + \sum_{g=1}^{G} (f_g + c) df_g dt_g\right) = \quad \text{Equation 8}$$

$$\frac{\sum_{j=1}^{m} N_j x_j}{\frac{1}{m}\sum_{j=1}^{m} x_j}\left(\frac{1}{m}\sum_{j=1}^{m} x_j \sum_{i=1}^{n} df_i dt_i + \sum_{g=1}^{G} f_g df_g dt_g + c\sum_{g=1}^{G} df_g dt_g\right) =$$

$$\frac{\sum_{j=1}^{m} N_j x_j}{\frac{1}{m}\sum_{j=1}^{m} x_j}\left(\frac{1}{m}\sum_{j=1}^{m} x_j \sum_{i=1}^{n} df_i dt_i + \sum_{g=1}^{G} f_g df_g dt_g +\right.$$

$$\left.\left(\frac{1}{\sum_{g=1}^{G} df_g dt_g}\right)\left[\frac{\sum_{j=1}^{m} x_j \sum_{j=1}^{m} N_j \sum_{g=1}^{G} f_g df_g dt_g}{m\sum_{j=1}^{m} N_j x_j} - \sum_{g=1}^{G} f_g df_g dt_g\right]\sum_{g=1}^{G} df_g dt_g\right) =$$

$$\frac{\sum_{j=1}^{m} N_j x_j}{\frac{1}{m}\sum_{j=1}^{m} x_j}\left(\frac{1}{m}\sum_{j=1}^{m} x_j \sum_{i=1}^{n} df_i dt_i + \sum_{g=1}^{G} f_g df_g dt_g +\right.$$

$$\left.\frac{\sum_{j=1}^{m} x_j \sum_{j=1}^{m} N_j \sum_{g=1}^{G} f_g df_g dt_g}{m\sum_{j=1}^{m} N_j x_j} - \sum_{g=1}^{G} f_g df_g dt_g\right) =$$

$$\frac{m\sum_{j=1}^{m} N_j x_j}{\sum_{j=1}^{m} x_j}\left(\frac{1}{m}\sum_{j=1}^{m} x_j \sum_{i=1}^{n} df_i dt_i +\right.$$

$$\left.\frac{\sum_{j=1}^{m} x_j \sum_{j=1}^{m} N_j \sum_{g=1}^{G} f_g df_g dt_g}{m\sum_{j=1}^{m} N_j x_j}\right) =$$

$$\left(\frac{m\sum_{j=1}^{m} N_j x_j}{\sum_{j=1}^{m} x_j} \frac{1}{m}\sum_{j=1}^{m} x_j \sum_{i=1}^{n} df_i dt_i + \frac{m\sum_{j=1}^{m} N_j x_j}{\sum_{j=1}^{m} x_j}\right.$$

$$\left.\frac{\sum_{j=1}^{m} x_j \sum_{j=1}^{m} N_j \sum_{g=1}^{G} f_g df_g dt_g}{m\sum_{j=1}^{m} N_j x_j}\right) =$$

$$\left(\sum_{j=1}^{m} N_j x_j \sum_{i=1}^{n} df_i dt_i + \sum_{j=1}^{m} N_j \sum_{g=1}^{G} f_g df_g dt_g\right) =$$

$$\sum_{j=1}^{m} N_j x_j \sum_{i=1}^{n} df_i dt_i + \sum_{j=1}^{m} N_j \sum_{g=1}^{G} f_g df_g dt_g$$

The last line of Equations 8 is the same as the alternate expression of the summed net present values of the m swaps shown in the last line of Equations 6.

Derivation of Equation 3

The second term in the last line of Equations 6 ($\sum_{j=1}^{m} N_j \sum_{g=1}^{G} f_g df_g dt_g$) represents a sum of the present values of the floating rate legs of the m swaps. As shown below in Equations 9a through 9g, Equation 3 can be derived by assuming that the floating leg of the compressed swap, which has a notional $N_B$ and floating rate ($f_g+c$), has a present value equal to the present value of the floating rate legs of the m swaps, and then solving for c:

$$N_B \sum_{g=1}^{G} (f_g + c) df_g dt_g = \sum_{j=1}^{m} N_j \sum_{g=1}^{G} f_g df_g dt_g \quad \text{Equation 9a}$$

$$\frac{\sum_{j=1}^{m} N_j x_j}{\frac{1}{m}\sum_{j=1}^{m} x_j} \sum_{g=1}^{G} (f_g + c) df_g dt_g = \sum_{j=1}^{m} N_j \sum_{g=1}^{G} f_g df_g dt_g \quad \text{Equation 9b}$$

$$\sum_{g=1}^{G} (f_g + c) df_g dt_g = \frac{\sum_{j=1}^{m} x_j \sum_{j=1}^{m} N_j \sum_{g=1}^{G} f_g df_g dt_g}{m\sum_{j=1}^{m} N_j x_j} \quad \text{Equation 9c}$$

$$\sum_{g=1}^{G} (f_g df_g dt_g + c df_g dt_g) = \frac{\sum_{j=1}^{m} x_j \sum_{j=1}^{m} N_j \sum_{g=1}^{G} f_g df_g dt_g}{m\sum_{j=1}^{m} N_j x_j} \quad \text{Equation 9d}$$

$$\sum_{g=1}^{G} f_g df_g dt_g + \sum_{g=1}^{G} c df_g dt_g = \frac{\sum_{j=1}^{m} x_j \sum_{j=1}^{m} N_j \sum_{g=1}^{G} f_g df_g dt_g}{m\sum_{j=1}^{m} N_j x_j} \quad \text{Equation 9e}$$

$$c\sum_{g=1}^{G} df_g dt_g = \frac{\sum_{j=1}^{m} x_j \sum_{j=1}^{m} N_j \sum_{g=1}^{G} f_g df_g dt_g}{m\sum_{j=1}^{m} N_j x_j} - \sum_{g=1}^{G} f_g df_g dt_g \quad \text{Equation 9f}$$

$$c = \frac{1}{\sum_{g=1}^{G} df_g dt_g}\left[\frac{\sum_{j=1}^{m} x_j \sum_{j=1}^{m} N_j \sum_{g=1}^{G} f_g df_g dt_g}{m\sum_{j=1}^{m} N_j x_j} - \sum_{g=1}^{G} f_g df_g dt_g\right] \quad \text{Equation 9g}$$

Derivation of Equation 4

As can be seen in Equations 8, the net present value of the sum of the m swaps is equal to the net present value of the compressed swap. This can be rewritten as shown below in Equation 10.

$$\sum_{j=1}^{m} N_j x_j \sum_{i=1}^{n} df_i dt_i + \sum_{j=1}^{m} N_j \sum_{g=1}^{G} f_g df_g dt_g = \quad \text{Equation 10}$$

$$N_B\left(x_B \sum_{i=1}^{n} df_i dt_i + \sum_{g=1}^{G} (f_g + c) df_g dt_g\right)$$

Limiting the precision of a value of c to D decimal places can be represented as:

$$\frac{1}{10^D}\left\lfloor 10^D c + \frac{1}{2} \right\rfloor$$

Limiting a difference between a sum of net present values for the m swaps (left side of Equation 10) and a net present value of a compressed swap (right side of Equation 10) to a value E when the precision of c is limited to D can be represented by Inequality 1:

$$\left| \sum_{j=1}^{m} N_j x_j \sum_{i=1}^{n} df_i dt_i + \sum_{j=1}^{m} N_j \sum_{g=1}^{G} f_g df_g dt_g - N_B \left( x_B \sum_{i=1}^{n} df_i dt_i + \sum_{g=1}^{G} \left( f_g + \frac{1}{10^D} \left\lfloor 10^D c + \frac{1}{2} \right\rfloor \right) df_g dt_g \right) \right| < E \quad \text{Inequality 1}$$

If E is set to 0.01, Inequality 1 represents a requirement that the precision D be such that the difference between the sum of net present values for the m swaps and a net present value of a compressed swap (with c having precision D) be less than one cent. Inequalities 2a through 2s show how Inequality 1 results in Equation 4.

$$\left| \sum_{j=1}^{m} N_j x_j \sum_{i=1}^{n} df_i dt_i + \sum_{j=1}^{m} N_j \sum_{g=1}^{G} f_g df_g dt_g - \frac{m \sum_{j=1}^{m} N_j x_j}{\sum_{j=1}^{m} x_j} \left( \frac{1}{m} \sum_{j=1}^{m} x_j \sum_{i=1}^{n} df_i dt_i + \sum_{g=1}^{G} f df_g dt_g + \sum_{g=1}^{G} \frac{1}{10^D} \left\lfloor 10^D c + \frac{1}{2} \right\rfloor df_g dt_g \right) \right| < E \quad \text{Inequality 2a}$$

(Note: Inequality 2a is similar to Inequality 1, but with $x_B$ and $N_B$ replaced by the expressions from Equations 1 and 2.)

$$\left| \sum_{j=1}^{m} N_j x_j \sum_{i=1}^{n} df_i dt_i + \sum_{j=1}^{m} N_j \sum_{g=1}^{G} f_g df_g dt_g - m \frac{\sum_{j=1}^{m} N_j x_j}{\sum_{j=1}^{m} x_j} \left( \frac{1}{m} \sum_{j=1}^{m} x_j \sum_{i=1}^{n} df_i dt_i + \sum_{g=1}^{G} f df_g dt_g + \frac{1}{10^D} \left\lfloor 10^D c + \frac{1}{2} \right\rfloor \sum_{g=1}^{G} df_g dt_g \right) \right| < E \quad \text{Inequality 2b}$$

$$\left| \sum_{j=1}^{m} N_j x_j \sum_{i=1}^{n} df_i dt_i + \sum_{j=1}^{m} N_j \sum_{g=1}^{G} f_g df_g dt_g - \frac{m \sum_{j=1}^{m} N_j x_j}{\sum_{j=1}^{m} x_j} \frac{\sum_{j=1}^{m} x_j}{m} \sum_{i=1}^{n} df_i dt_i - \frac{m \sum_{j=1}^{m} N_j x_j}{\sum_{j=1}^{m} x_i} \sum_{g=1}^{G} f df_g dt_g - \frac{m \sum_{j=1}^{m} N_j x_j}{\sum_{j=1}^{m} x_j} \frac{1}{10^D} \left\lfloor 10^D c + \frac{1}{2} \right\rfloor \sum_{g=1}^{G} df_g dt_g \right| < E \quad \text{Inequality 2c}$$

$$\left| \sum_{j=1}^{m} N_j x_j \sum_{i=1}^{n} df_i dt_i + \sum_{j=1}^{m} N_j \sum_{g=1}^{G} f_g df_g dt_g - \sum_{j=1}^{m} N_j x_j \sum_{i=1}^{n} df_i dt_i - \frac{m \sum_{j=1}^{m} N_j x_j}{\sum_{j=1}^{m} x_j} \sum_{g=1}^{G} f df_g dt_g - \frac{m \sum_{j=1}^{m} N_j x_j}{\sum_{j=1}^{m} x_j} \frac{1}{10^D} \left\lfloor 10^D c + \frac{1}{2} \right\rfloor \sum_{g=1}^{G} df_g dt_g \right| < E \quad \text{Inequality 2d}$$

$$\left| \sum_{j=1}^{m} N_j \sum_{g=1}^{G} f_g df_g dt_g - \frac{m \sum_{j=1}^{m} N_j x_j}{\sum_{j=1}^{m} x_j} \sum_{g=1}^{G} f df_g dt_g - \frac{m \sum_{j=1}^{m} N_j x_j}{\sum_{j=1}^{m} x_j} \frac{1}{10^D} \left\lfloor 10^D c + \frac{1}{2} \right\rfloor \sum_{g=1}^{G} df_g dt_g \right| < E \quad \text{Inequality 2e}$$

$$\left| \sum_{g=1}^{G} f_g df_g dt_g \left( \sum_{j=1}^{m} N_j - \frac{m \sum_{j=1}^{m} N_j x_j}{\sum_{j=1}^{m} x_j} \right) - \frac{m \sum_{j=1}^{m} N_j x_j}{\sum_{j=1}^{m} x_j} \frac{1}{10^D} \left\lfloor 10^D c + \frac{1}{2} \right\rfloor \sum_{g=1}^{G} df_g dt_g \right| < E \quad \text{Inequality 2f}$$

$$-E < \sum_{g=1}^{G} f_g df_g dt_g \left( \sum_{j=1}^{m} N_j - \frac{m \sum_{j=1}^{m} N_j x_j}{\sum_{j=1}^{m} x_j} \right) - \frac{m \sum_{j=1}^{m} N_j x_j}{\sum_{j=1}^{m} x_j} \frac{1}{10^D} \left\lfloor 10^D c + \frac{1}{2} \right\rfloor \sum_{g=1}^{G} df_g dt_g < E \quad \text{Inequality 2g}$$

$$-E - \sum_{g=1}^{G} f_g df_g dt_g \left( \sum_{j=1}^{m} N_j - \frac{m \sum_{j=1}^{m} N_j x_j}{\sum_{j=1}^{m} x_j} \right) < -\frac{m \sum_{j=1}^{m} N_j x_j}{\sum_{j=1}^{m} x_j} \frac{1}{10^D} \left\lfloor 10^D c + \frac{1}{2} \right\rfloor \sum_{g=1}^{G} df_g dt_g < E - \sum_{g=1}^{G} f_g df_g dt_g \left( \sum_{j=1}^{m} N_j - \frac{m \sum_{j=1}^{m} N_j x_j}{\sum_{j=1}^{m} x_j} \right) \quad \text{Inequality 2h}$$

$$-E - \sum_{g=1}^{G} f_g df_g dt_g \left( \sum_{j=1}^{m} N_j - \frac{m \sum_{j=1}^{m} N_j x_j}{\sum_{j=1}^{m} x_j} \right) < -\frac{m \sum_{j=1}^{m} N_j x_j}{\sum_{j=1}^{m} x_i} \frac{1}{10^D} \left\lfloor 10^D c + \frac{1}{2} \right\rfloor \sum_{g=1}^{G} df_g dt_g < E - \sum_{g=1}^{G} f_g df_g dt_g \left( \sum_{j=1}^{m} N_j - \frac{m \sum_{j=1}^{m} N_j x_j}{\sum_{j=1}^{m} x_j} \right) \quad \text{Inequality 2i}$$

$$-E - \sum_{g=1}^{G} f_g df_g dt_g \left( \sum_{j=1}^{m} N_j - \frac{m \sum_{j=1}^{m} N_j x_j}{\sum_{j=1}^{m} x_j} \right) < -\sum_{g=1}^{G} df_g dt_g \frac{m \sum_{j=1}^{m} N_j x_j}{\sum_{j=1}^{m} x_j} \frac{1}{10^D} \left\lfloor 10^D c + \frac{1}{2} \right\rfloor < E - \sum_{g=1}^{G} f_g df_g dt_g \left( \sum_{j=1}^{m} N_j - \frac{m \sum_{j=1}^{m} N_j x_j}{\sum_{j=1}^{m} x_j} \right) \quad \text{Inequality 2j}$$

$$-\frac{\left[ -E - \sum_{g=1}^{G} f_g df_g dt_g \left( \sum_{j=1}^{m} N_j - \frac{m \sum_{j=1}^{m} N_j x_j}{\sum_{j=1}^{m} x_j} \right) \right]}{\sum_{g=1}^{G} df_g dt_g \frac{m \sum_{j=1}^{m} N_j x_j}{\sum_{j=1}^{m} x_j}} > \frac{1}{10^D} \left\lfloor 10^D c + \frac{1}{2} \right\rfloor > \quad \text{Inequality 2k}$$

$$-\frac{\left[E - \sum_{g=1}^{G} f_g d f_g d t_g \left(\sum_{j=1}^{m} N_j - \frac{m \sum_{j=1}^{m} N_j x_j}{\sum_{j=1}^{m} x_j}\right)\right]}{\sum_{g=1}^{G} d f_g d t_g \frac{m \sum_{j=1}^{m} N_j x_j}{\sum_{j=1}^{m} x_j}}$$

Inequality 21

$$\frac{\left[E + \sum_{g=1}^{G} f_g d f_g d t_g \left(\sum_{j=1}^{m} N_j - \frac{m \sum_{j=1}^{m} N_j x_j}{\sum_{j=1}^{m} x_j}\right)\right]}{\sum_{g=1}^{G} d f_g d t_g \frac{m \sum_{j=1}^{m} N_j x_j}{\sum_{j=1}^{m} x_j}} >$$

$$\frac{1}{10^D}\left\lfloor 10^D c + \frac{1}{2} \right\rfloor >$$

$$\frac{\left[-E + \sum_{g=1}^{G} f_g d f_g d t_g \left(\sum_{j=1}^{m} N_j - \frac{m \sum_{j=1}^{m} N_j x_j}{\sum_{j=1}^{m} x_j}\right)\right]}{\sum_{g=1}^{G} d f_g d t_g \frac{m \sum_{j=1}^{m} N_j x_j}{\sum_{j=1}^{m} x_j}}$$

Inequality 2m $$\frac{1}{10^D}\left\lfloor 10^D c + \frac{1}{2} \right\rfloor <$$

$$\left|\frac{\left[E + \sum_{g=1}^{G} f_g d f_g d t_g \left(\sum_{j=1}^{m} N_j - \frac{m \sum_{j=1}^{m} N_j x_j}{\sum_{j=1}^{m} x_j}\right)\right]}{\sum_{g=1}^{G} d f_g d t_g \frac{m \sum_{j=1}^{m} N_j x_j}{\sum_{j=1}^{m} x_j}}\right|$$

Inequality 2n $$\frac{1}{10^D}(10^D c + 1) <$$

$$\left|\frac{\left[E + \sum_{g=1}^{G} f_g d f_g d t_g \left(\sum_{j=1}^{m} N_j - \frac{m \sum_{j=1}^{m} N_j x_j}{\sum_{j=1}^{m} x_j}\right)\right]}{\sum_{g=1}^{G} d f_g d t_g \frac{m \sum_{j=1}^{m} N_j x_j}{\sum_{j=1}^{m} x_j}}\right|$$

(Note: Inequality 2n, in comparison to Inequality 2m, reflects the fact that $$\left\lfloor 10^D c + \frac{1}{2} \right\rfloor \leq (10^D c + 1).)$$

Inequality 2o $$\left(c + \frac{1}{10^D}\right) <$$

$$\left|\frac{\left[E + \sum_{g=1}^{G} f_g d f_g d t_g \left(\sum_{j=1}^{m} N_j - \frac{m \sum_{j=1}^{m} N_j x_j}{\sum_{j=1}^{m} x_j}\right)\right]}{\sum_{g=1}^{G} d f_g d t_g \frac{m \sum_{j=1}^{m} N_j x_j}{\sum_{j=1}^{m} x_j}}\right|$$

Inequality 2p $$\frac{1}{10^D} < \left|\frac{\left[E + \sum_{g=1}^{G} f_g d f_g d t_g \left(\sum_{j=1}^{m} N_j - \frac{m \sum_{j=1}^{m} N_j x_j}{\sum_{j=1}^{m} x_j}\right)\right]}{\sum_{g=1}^{G} d f_g d t_g \frac{m \sum_{j=1}^{m} N_j x_j}{\sum_{j=1}^{m} x_j}}\right| - c$$

Inequality 2q $$10^D > \frac{1}{\left|\frac{\left[E + \sum_{g=1}^{G} f_g d f_g d \left(t_g \left(\sum_{j=1}^{m} N_j - \frac{m \sum_{j=1}^{m} N_j x_j}{\sum_{j=1}^{m} x_j}\right)\right)\right]}{\sum_{g=1}^{G} d f_g d t_g \frac{m \sum_{j=1}^{m} N_j x_j}{\sum_{j=1}^{m} x_j}}\right| - c}$$

Inequality 2r $$D \log(10) > \log\left(\frac{1}{\left|\frac{\left[E + \sum_{g=1}^{G} f_g d f_g d \left(t_g \left(\sum_{j=1}^{m} N_j - \frac{m \sum_{j=1}^{m} N_j x_j}{\sum_{j=1}^{m} x_j}\right)\right)\right]}{\sum_{g=1}^{G} d f_g d t_g \frac{m \sum_{j=1}^{m} N_j x_j}{\sum_{j=1}^{m} x_j}}\right| - c}\right)$$

Inequality 2s $$D > \log\left(\frac{1}{\left|\frac{\left[E + \sum_{g=1}^{G} f_g d f_g d \left(t_g \left(\sum_{j=1}^{m} N_j - \frac{m \sum_{j=1}^{m} N_j x_j}{\sum_{j=1}^{m} x_j}\right)\right)\right]}{\sum_{g=1}^{G} d f_g d t_g \frac{m \sum_{j=1}^{m} N_j x_j}{\sum_{j=1}^{m} x_j}}\right| - c}\right)$$

Equation 4

$$D = \left|\log\left(\frac{1}{\left|\frac{\left[E + \Sigma_{g=1}^{G} f_g d f_g d t_g \left(\Sigma_{j=1}^{m} N_j - \frac{m \Sigma_{j=1}^{m} N_j x_j}{\Sigma_{j=1}^{m} x_j}\right)\right]}{\Sigma_{g=1}^{G} d f_g d t_g \frac{m \Sigma_{j=1}^{m} N_j x_j}{\Sigma_{j=1}^{m} x_j}}\right| - c}\right)\right|$$

In any of the above aspects, the various features may be implemented in hardware, or as software modules running on one or more processors. Features of one aspect may be applied to any of the other aspects.

There may also be provided a computer program or a computer program product for carrying out any of the methods described herein, and a computer readable medium having stored thereon a program for carrying out any of the methods described herein. A computer program may be stored on a computer-readable medium, or it could, for example, be in the form of a signal such as a downloadable data signal provided from an Internet website, or it could be in any other form.

CONCLUSION

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

We claim:

1. A method comprising:
   accessing, in a non-transitory memory device by a computer system, data corresponding to a portfolio comprising a plurality of interest rate swaps, each being characterized by a risk value;
   comparing, by the computer system, a data size of the portfolio to a defined data storage capacity of the non-transitory memory device;
   performing, automatically by the computer system when the data size of the portfolio exceeds the defined data storage capacity:
   calculating, by the computer system, a compressed swap having a risk value equivalent to a sum of the risk values of each of the plurality of interest rate swaps of the portfolio; and
   storing, by the computer system, second data comprising a compressed portfolio comprising the compressed swap by replacing the data comprising the portfolio in the non-transitory memory device with the second data to minimize a data storage requirement of the portfolio in the non-transitory memory device.

2. The method of claim 1, further comprising:
   determining, by the computer system, a performance bond requirement attributable to the plurality of interest rate swaps;
   comparing, by the computer system, the performance bond requirement to account data associated with a holder of the portfolio;
   performing, by the computer system, one or more additional actions based on the comparing comprising at least one of (i) storing data regarding satisfaction of the performance bond requirement, and (ii) transmitting a communication regarding the performance bond requirement.

3. The method of claim 1, wherein
   calculating, for the compressed swap, a compressed swap fixed rate value $x_B$, a compressed swap notional value $N_B$, and a compressed swap floating rate spread value $c$ according to $$x_B = \frac{1}{m}\sum_{j=1}^{m} x_j,$$

$$N_B = \frac{\sum_{j=1}^{m} N_j x_j}{x_B}, \text{ and}$$

$$c = \frac{1}{\sum_{g=1}^{G} f_g df_g dt_g}\left[\frac{\sum_{j=1}^{m} x_j \sum_{j=1}^{m} N_j \sum_{g=1}^{G} f_g df_g dt_g}{m\sum_{j=1}^{m} N_j x_j} - \sum_{g=1}^{G} f_g df_g dt_g\right], \text{ and}$$

$x_j$ is a fixed rate value for the $j^{th}$ interest rate swap, wherein m is the number of interest rate swaps in the portfolio of interest rate swaps, $N_j$ is a notional value of the $j^{th}$ interest rate swap, G is the number of floating rate payment periods in the common tenor, $f_g$ is a floating rate value corresponding to the $g^{th}$ floating rate payment period, $df_g$ is a floating rate discount factor corresponding to the $g^{th}$ floating rate payment period, and $dt_g$ is a duration of the $g^{th}$ floating rate payment period.

4. The method of claim 3, further comprising accessing swap curve data comprising values for $f_g$, $df_g$, and $dt_g$.

5. The method of claim 1, wherein
   a DV01 value for the compressed swap is the same as a sum of DV01 values for the interest rate swaps, and
   a CV01 value for the compressed swap is the same as a sum of CV01 values for the interest rate swaps.

6. The method of claim 1, further comprising:
   determining a performance bond requirement of the plurality of interest rate swaps based on first and second disaggregated swaps,
   the first disaggregated swap comprises a compressed swap fixed rate value $x_B$, a first disaggregated swap notional value $N_{B1}$, and a first disaggregated swap spread value $c_1$, and
   the second disaggregated swap comprises the compressed swap fixed rate value $x_B$, a second disaggregated swap notional value $N_{B2}$, and a second disaggregated swap spread value $c_2$, and further comprising:
   determining a required precision for the floating rate spread value c;
   determining the required precision is greater than an available precision;
   based on the determining that the required precision is greater than an available precision, selecting a $c_1$ value greater than the c value and a $c_2$ value less than the c value; and
   determining $N_{B1}$ and $N_{B2}$ values such $N_{B1}*c_1 + N_{B2}*c_2 = N_B*c$ and such that $N_{B1}+N_{B2}=N_B$.

7. The method of claim 6, wherein:
   determining the required precision comprises determining the required precision according to $$D = \left|\log\left(\frac{1}{\left|\left(E + \sum_{g=1}^{G} f_g df_g dt_g\left(\sum_{j=1}^{m} N_j \frac{m\sum_{j=1}^{m} N_j x_j}{\sum_{j=1}^{m} x_j}\right)\right)\right| - c}{\sum_{g=1}^{G} df_g dt_g \frac{m\sum_{j=1}^{m} N_j x_j}{\sum_{j=1}^{m} x_j}}\right)\right|, \text{ and}$$

D is the required precision, E is a constant chosen to limit a difference between a present value of the compressed swap and combined present values of the plurality of interest rate swaps, m is the number of interest rate swaps in the portfolio of interest rate swaps, $x_j$ is a fixed rate value for the $j^{th}$ interest rate swap, $N_j$ is a notional value of the $j^{th}$ interest rate swap, G is the number of floating rate payment periods in the common tenor, $f_g$ is a floating rate value corresponding to the $g^{th}$ floating rate payment period, $df_g$ is a floating rate discount factor corresponding to the $g^{th}$ floating rate payment period, and $dt_g$ is a duration of the $g^{th}$ floating rate payment period.

8. A non-transitory computer-readable media storing computer executable instructions that, when executed, cause a computer system to perform operations that include:

accessing stored data in a non-transitory memory device corresponding to a portfolio comprising a plurality of interest rate swaps, each being characterized by a risk value;

comparing, by the computer system, a data size of the portfolio to a defined data storage capacity of the non-transitory memory device;

performing, automatically by the computer system when the size of the portfolio exceeds the defined data storage capacity:

calculating a compressed swap having a risk value equivalent to a sum of the risk values of each of the plurality of interest rate swaps of the portfolio; and storing, by the computer system, second data comprising a compressed portfolio comprising the compressed swap by replacing the data comprising the portfolio in the non-transitory memory device with the second data to minimize a data storage requirement of the portfolio in the non-transitory memory device.

9. The one or more non-transitory computer-readable media of claim 8, wherein the computer executable instructions are further executable to cause the computer system to perform operations that include:

determining, based at least in part on the compressed swap parameters, a performance bond requirement attributable to the interest rate swaps;

comparing the performance bond requirement to account data associated with a holder of the portfolio;

performing one or more additional actions based on the comparing comprising at least one of (i) storing data regarding satisfaction of the performance bond requirement, and (ii) transmitting a communication regarding the performance bond requirement.

10. The one or more non-transitory computer-readable media of claim 8, wherein the computer executable instructions are further executable to cause the computer system to perform operations that include:

calculating, for the compressed swap, a compressed swap fixed rate value $x_B$, a compressed swap notional value $N_B$, and a compressed swap floating rate spread value c according to $$x_B = \frac{1}{m}\sum_{j=1}^{m} x_j,$$

$$N_B = \frac{\sum_{j=1}^{m} N_j x_j}{x_B}, \text{ and}$$

$$c = \frac{1}{\sum_{g=1}^{G} df_g dt_g}\left[\frac{\sum_{j=1}^{m} x_j \sum_{j=1}^{m} N_j \sum_{g=1}^{G} f_g df_g dt_g}{m\sum_{j=1}^{m} N_j x_j} - \sum_{g=1}^{G} f_g df_g dt_g\right], \text{ and}$$

$x_j$ is a fixed rate value for the $j^{th}$ interest rate swap, wherein m is the number of interest rate swaps in the portfolio of interest rate swaps, $N_j$ is a notional value of the $j^{th}$ interest rate swap, G is the number of floating rate payment periods in the common tenor, $f_g$ is a floating rate value corresponding to the $g^{th}$ floating rate payment period, $df_g$ is a floating rate discount factor corresponding to the $g^{th}$ floating rate payment period, and $dt_g$ is a duration of the $g^{th}$ floating rate payment period.

11. The one or more non-transitory computer-readable media of claim 10, wherein the computer executable instructions are further executable to cause the computer system to perform operations that include accessing swap curve data comprising values for $f_g$, $df_g$, and $dt_g$.

12. The one or more non-transitory computer-readable media of claim 8, wherein a DV01 value for the compressed swap is the same as a sum of DV01 values for the interest rate swaps, and a CV01 value for the compressed swap is the same as a sum of CV01 values for the interest rate swaps.

13. The one or more non-transitory computer-readable media of claim 8, wherein the computer executable instructions are further executable to cause the computer system to perform operations that include:

determining a performance bond requirement of the plurality of interest rate swaps based on first and second disaggregated swaps, the first disaggregated swap comprises a compressed swap fixed rate value $x_B$, a first disaggregated swap notional value $N_{B1}$, and a first disaggregated swap spread value $c_1$, and the second disaggregated swap comprises the compressed swap fixed rate value $x_B$, a second disaggregated swap notional value $N_{B2}$, and a second disaggregated swap spread value $c_2$, and further comprising stored computer executable instructions that, when executed, cause the computer system to perform operations that include:

determining a required precision for the floating rate spread value c;

determining the required precision is greater than an available precision;

based on the determining that the required precision is greater than an available precision, selecting a C1 value greater than the c value and a $c_2$ value less than the c value; and determining $N_{B1}$ and $N_{B2}$ values such $N_{B1}*c_1 + N_{B2}*c_2 = N_B*c$ and such that $N_{B1}+N_{B2}=N_B$.

14. The one or more non-transitory computer-readable media of claim 13, wherein:

determining the required precision comprises determining the required precision according to $$D = \left|\log\left(\frac{1}{\left\|\frac{\left\|E + \sum_{g=1}^{G} f_g df_g dt_g\left(\sum_{j=1}^{m} N_j \frac{m\sum_{j=1}^{m} N_j x_j}{\sum_{j=1}^{m} x_j}\right)\right\|}{\sum_{g=1}^{G} df_g dt_g \frac{m\sum_{j=1}^{m} N_j x_j}{\sum_{j=1}^{m} x_j}}\right\| - c}\right)\right|, \text{ and}$$

D is the required precision, E is a constant chosen to limit a difference between a present value of the compressed swap and combined present values of the plurality of interest rate swaps, m is the number of interest rate swaps in the portfolio of interest rate swaps, $x_j$ is a fixed rate value for the $j^{th}$ interest rate swap, $N_j$ is a notional value of the $j^{th}$ interest rate swap, G is the number of floating rate payment periods in the common tenor, $f_g$ is a floating rate value corresponding to the $g^{th}$ floating rate payment period, $df_g$ is a floating rate discount factor corresponding to the $g^{th}$ floating rate payment period, and $dt_g$ is a duration of the $g^{th}$ floating rate payment period.

15. A computer system comprising:

a memory device having a defined storage capacity;

at least one processor coupled with the memory device; and at least one non-transitory memory coupled with the processor, wherein the at least one non-transitory memory stores instructions that, when executed, cause the processor to perform operations that include:
- accessing stored data in the non-transitory memory device corresponding to a portfolio comprising a plurality of interest rate swaps, each being characterized by a risk value;
- comparing, by the computer system, a data size of the portfolio to the defined data storage capacity and when the size of the portfolio exceeds the defined data storage capacity, performing, automatically by the computer system:
  - calculating a compressed swap having a risk value equivalent to a sum of the risk values of each of the plurality of interest rate swaps of the portfolio; and
  - storing, by the computer system, second data comprising a compressed portfolio comprising the compressed swap by replacing the data comprising the portfolio in the non-transitory memory device with the second data to minimize a data storage requirement of the portfolio in the non-transitory memory device.

16. The computer system of claim 15, wherein the instructions are further executable to cause the processor to perform operations that include:
- determining, based at least in part on the compressed swap parameters, a performance bond requirement attributable to the interest rate swaps;
- comparing the performance bond requirement to account data associated with a holder of the portfolio;
- performing one or more additional actions based on the comparing comprising at least one of (i) storing data regarding satisfaction of the performance bond requirement, and (ii) transmitting a communication regarding the performance bond requirement.

17. The computer system of claim 15, wherein the instructions are further executable to cause the processor to perform operations that include:
- calculating, for the compressed swap, a compressed swap fixed rate value $x_B$, a compressed swap notional value $N_B$, and a compressed swap floating rate spread value c according to $$x_B = \frac{1}{m}\sum_{j=1}^{m} x_j,$$

$$N_B = \frac{\sum_{j=1}^{m} N_j x_j}{x_B}, \text{ and}$$

$$c = \frac{1}{\sum_{g=1}^{G} df_g dt_g}\left[\frac{\sum_{j=1}^{m} x_j \sum_{j=1}^{m} N_j \sum_{g=1}^{G} f_g df_g dt_g}{m\sum_{j=1}^{m} N_j x_j} - \sum_{g=1}^{G} f_g df_g dt_g\right], \text{ and}$$

$x_j$ is a fixed rate value for the $j^{th}$ interest rate swap, wherein $N_j$ is a notional value of the $j^{th}$ interest rate swap, wherein m is the number of interest rate swaps in the portfolio of interest rate swaps, G is the number of floating rate payment periods in the common tenor, $f_g$ is a floating rate value corresponding to the $g^{th}$ floating rate payment period, $df_g$ is a floating rate discount factor corresponding to the $g^{th}$ floating rate payment period, and $dt_g$ is a duration of the $g^{th}$ floating rate payment period.

18. The computer system of claim 17, wherein the instructions are further executable to cause the processor to perform operations that include accessing swap curve data comprising values for $f_g$, $df_g$, and $dt_g$.

19. The computer system of claim 15, wherein
- a DV01 value for the compressed swap is the same as a sum of DV01 values for the interest rate swaps, and
- a CV01 value for the compressed swap is the same as a sum of CV01 values for the interest rate swaps.

20. The computer system of claim 15, wherein the instructions are further executable to cause the processor to perform operations that include:
- determining a performance bond requirement attributable to the plurality of interest rate swaps based on first and second disaggregated swaps,
- the first disaggregated swap comprises a compressed swap fixed rate value $x_B$, a first disaggregated swap notional value $N_{B1}$, and a first disaggregated swap spread value $c_1$, and
- the second disaggregated swap comprises the compressed swap fixed rate value $x_B$, a second disaggregated swap notional value $N_{B2}$, and a second disaggregated swap spread value $c_2$, and wherein the at least one non-transitory memory stores instructions that, when executed, cause the computer system to perform operations that include
  - determining a required precision for the floating rate spread value c,
  - determining the required precision is greater than an available precision,
  - based on the determining that the required precision is greater than an available precision, selecting a $c_1$ value greater than the c value and a $c_2$ value less than the c value, and
  - determining $N_{B1}$ and $N_{B2}$ values such $N_{B1}*c_1 + N_{B2}*c_2 = N_B*c$ and such that $N_{B1}+N_{B2}=N_B$.

21. The computer system of claim 20, wherein the instructions are further executable to cause the processor to perform operations that include:
- determining the required precision comprises determining the required precision according to $$D = \left|\log\left(\frac{1}{\left|\frac{\left[E + \sum_{g=1}^{G} f_g df_g dt_g\left(\sum_{j=1}^{m} N_j \frac{m\sum_{j=1}^{m} N_j x_j}{\sum_{j=1}^{m} x_j}\right)\right]}{\sum_{g=1}^{G} df_g dt_g \frac{m\sum_{j=1}^{m} N_j x_j}{\sum_{j=1}^{m} x_j}}\right| - c\right)\right|, \text{ and}$$

D is the required precision, E is a constant chosen to limit a difference between a present value of the compressed swap and combined present values of the interest rate swaps, m is the number of interest rate swaps in the portfolio of interest rate swaps, $x_j$ is a fixed rate value for the $j^{th}$ interest rate swap, $N_j$ is a notional value of the $j^{th}$ interest rate swap, G is the number of floating rate payment periods in the common tenor, $f_g$ is a floating rate value corresponding to the $g^{th}$ floating rate payment period, $df_g$ is a floating rate discount factor corresponding to the $g^{th}$ floating rate payment period, and $dt_g$ is a duration of the $g^{th}$ floating rate payment period.

* * * * *

UNITED STATES PATENT AND TRADEMARK OFFICE
CERTIFICATE OF CORRECTION

PATENT NO. : 11,847,702 B2
APPLICATION NO. : 17/020423
DATED : December 19, 2023
INVENTOR(S) : David Andrew Boberski et al.

Page 1 of 1

It is certified that error appears in the above-identified patent and that said Letters Patent is hereby corrected as shown below:

In the Claims

Column 22, Claim 13, Line 33:
Please change "C1" to "$c_1$"

Signed and Sealed this
Thirtieth Day of January, 2024

Katherine Kelly Vidal
*Director of the United States Patent and Trademark Office*